(12) United States Patent
Robesky

(10) Patent No.: US 9,571,361 B1
(45) Date of Patent: Feb. 14, 2017

(54) STATUS REPORTING SYSTEM

(71) Applicant: ShoreTel, Inc., Sunnyvale, CA (US)

(72) Inventor: Kenneth A. Robesky, Mountain View, CA (US)

(73) Assignee: Shoretel, Inc., Sunnyvale, CA (US)

(\*) Notice: Subject to any disclaimer, the term of this patent is extended or adjusted under 35 U.S.C. 154(b) by 20 days.

(21) Appl. No.: 14/066,688

(22) Filed: Oct. 29, 2013

Related U.S. Application Data

(63) Continuation of application No. 12/571,065, filed on Sep. 30, 2009, now Pat. No. 8,582,450.

(51) Int. Cl.
| | | |
|---|---|---|
| *H04L 12/26* | (2006.01) | |
| *H04L 12/42* | (2006.01) | |
| *H04L 12/28* | (2006.01) | |
| *H04L 12/44* | (2006.01) | |
| *G04F 13/00* | (2006.01) | |
| *G06F 15/16* | (2006.01) | |

(52) U.S. Cl.
CPC ............... *H04L 43/0805* (2013.01)

(58) Field of Classification Search
CPC ...... H04L 12/185; H04L 12/44; H04L 414/06; H04L 414/12; H04L 41/12; H04L 41/044; H04L 45/02; H04L 45/00; H04L 45/48; H04L 45/20; H04L 12/2602
USPC ........ 370/408, 400, 401, 256; 709/252, 223, 709/224, 243
See application file for complete search history.

(56) References Cited

U.S. PATENT DOCUMENTS

| | | | | |
|---|---|---|---|---|
| 5,117,430 A | * | 5/1992 | Berglund | 370/408 |
| 5,404,565 A | * | 4/1995 | Gould et al. | 709/237 |
| 5,781,551 A | * | 7/1998 | Born | 370/408 |
| 5,796,793 A | * | 8/1998 | Kainulainen | 375/356 |
| 6,078,970 A | * | 6/2000 | Nordstrom | G06F 13/24 709/223 |
| 6,085,278 A | * | 7/2000 | Gates | G06F 13/32 710/22 |
| 6,449,667 B1 | * | 9/2002 | Ganmukhi | G06F 11/08 370/408 |
| 6,529,951 B1 | * | 3/2003 | Okuyama | H04L 12/40013 370/257 |
| 6,606,676 B1 | * | 8/2003 | Deshpande | G06F 13/24 710/260 |
| 6,687,865 B1 | * | 2/2004 | Dervisoglu | G01R 31/31705 714/726 |
| 6,742,139 B1 | * | 5/2004 | Forsman | G06F 11/0724 714/23 |

(Continued)

*Primary Examiner* — Wutchung Chu
(74) *Attorney, Agent, or Firm* — Tarolli, Sundheim, Covell & Tummino LLP

(57) ABSTRACT

A supervisor entity comprises an entity status module for maintaining status of its subordinate entities and updating the supervisor entity with status updates for itself and the subordinate entities. The entity status module comprises an entity status controller for receiving a status message from a first subordinate entity, a subordinate determination module for determining a second subordinate entity that is subordinate to the first subordinate entity, a status update module for updating the status of the second subordinate entity based on the received status message from the first subordinate entity, a status reporting module for reporting the updated status of the second subordinate entity to a supervisor entity and a status storage for storing the status of the second subordinate entity.

17 Claims, 5 Drawing Sheets

(56) References Cited

U.S. PATENT DOCUMENTS

| | | | |
|---|---|---|---|
| 6,980,537 B1* | 12/2005 | Liu | H04L 45/46 370/277 |
| 7,031,329 B2* | 4/2006 | Lipsanen | H04J 3/0679 370/408 |
| 7,177,908 B1 | 2/2007 | Chang et al. | |
| 7,248,568 B1* | 7/2007 | Loc | H04W 76/023 370/312 |
| 7,290,076 B2* | 10/2007 | Valenci | H04L 69/28 710/260 |
| 7,554,932 B1* | 6/2009 | Shurmantine | H04B 7/155 370/279 |
| 7,773,615 B2* | 8/2010 | Hibino | H04N 21/4381 370/408 |
| 7,835,265 B2* | 11/2010 | Wang | H04L 41/0663 370/216 |
| 7,843,855 B2* | 11/2010 | O'Neal | 370/256 |
| 7,853,565 B1 | 12/2010 | Liskov | |
| 7,911,980 B1* | 3/2011 | Smiljanic | 370/256 |
| 8,004,966 B2 | 8/2011 | Koch et al. | |
| 8,036,247 B2* | 10/2011 | Frank | G06F 1/12 370/503 |
| 8,139,493 B2* | 3/2012 | Kato et al. | 370/241 |
| 8,200,842 B1 | 6/2012 | Lau | |
| 8,233,471 B2* | 7/2012 | Brownrigg | H04L 29/06 370/351 |
| 8,381,212 B2* | 2/2013 | Brelsford | G06F 9/4843 709/201 |
| 8,473,898 B2* | 6/2013 | Pandey | G06F 8/20 717/104 |
| 8,495,185 B2* | 7/2013 | D'Alterio | H04L 12/26 709/221 |
| 9,128,920 B2* | 9/2015 | Ning | G06F 13/24 |
| 9,146,776 B1* | 9/2015 | Geddes | G06F 13/24 |
| 2002/0159463 A1 | 10/2002 | Wang | |
| 2003/0179721 A1* | 9/2003 | Shurmantine | H04B 7/2606 370/315 |
| 2004/0030819 A1* | 2/2004 | Williams | G06F 13/24 710/260 |
| 2004/0088309 A1* | 5/2004 | Koh et al. | 707/100 |
| 2005/0073985 A1* | 4/2005 | Heo | H04B 7/2628 370/342 |
| 2005/0097196 A1* | 5/2005 | Wronski | H04B 7/2628 709/223 |
| 2005/0283530 A1* | 12/2005 | O'Neal | H04L 12/1854 709/224 |
| 2006/0020686 A1* | 1/2006 | Liss et al. | 709/219 |
| 2006/0218301 A1* | 9/2006 | O'Toole | H04L 12/185 709/244 |
| 2007/0053363 A1* | 3/2007 | Chen | H04L 12/5695 370/395.21 |
| 2007/0091909 A1* | 4/2007 | Hibino et al. | 370/401 |
| 2007/0258376 A1 | 11/2007 | Li | |
| 2009/0003306 A1* | 1/2009 | Plutov | H04W 72/10 370/348 |
| 2009/0094605 A1* | 4/2009 | Brelsford et al. | 718/100 |
| 2009/0154395 A1* | 6/2009 | Park | H04W 40/12 370/328 |
| 2009/0154482 A1* | 6/2009 | Ham | H04L 45/02 370/408 |
| 2009/0268609 A1* | 10/2009 | Koch et al. | 370/222 |
| 2010/0232437 A1* | 9/2010 | Bajpai | H04L 1/1628 370/400 |
| 2010/0325485 A1 | 12/2010 | Kamath et al. | |
| 2011/0016036 A1 | 1/2011 | Rosenberg et al. | |
| 2011/0178985 A1* | 7/2011 | San Martin Arribas | G06F 17/30584 707/636 |

\* cited by examiner

STATUS REPORTING SYSTEM

CROSS-REFERENCE TO RELATED APPLICATIONS

This application is a Continuation of and claims priority under 35 U.S.C. §120 to U.S. patent application Ser. No. 12/571,065, titled "Status Reporting System" filed Sep. 30, 2009, the entire contents of which is incorporated by reference herein.

Applicants hereby rescind any disclaimer of claim scope in the parent application (namely U.S. application Ser. No. 12/571,065) or the prosecution history thereof and advise the US Patent and Trademark Office (USPTO) that the claims in this continuation application may be broader than any claim in the parent application. Accordingly, Applicants notify the USPTO of a need to re-visit the disclaimer of claim scope in the parent application, and to further re-visit all prior art cited in the parent application, including but not limited to cited references over which any disclaimer of claim scope was made in the parent application or the prosecution history thereof. See Hakim v. Cannon Avent Group, PLC, 479 F.3d 1313 (Fed. Cir. 2007). Moreover, any disclaimer made in the current application should not be read into or against the parent.

BACKGROUND OF THE INVENTION

1. Field of the Invention

This invention relates to maintaining status of devices in a network. In particular, the invention relates to systems and methods for efficiently reporting device status in a network. Still more particularly, the invention relates to reporting device status in a Voice over IP network.

2. Description of the Background Art

Status reporting is an important aspect of every system comprising a number of devices that can have one or more states. The network devices keep track of other devices in the network by receiving and updating status of the other devices. While staying updated regarding the status of other entities is important, it comes at the cost of consuming resources of the network and network devices to send and receive status updates.

The problem of overloading the network and network devices becomes even more acute in a network where a large number of entities change state at the same instant. For example, when a network or a network node comprising a large number of entities restarts, all the entities in the restarted node transmit their updated status to other entities in the network. The result is a network congested with status update messages and network entities overloaded with receiving a large number of status updates.

SUMMARY OF THE INVENTION

Systems and methods for efficiently reporting and updating status for various entities in a network are described. A network comprises various supervisor entities and subordinate entities. A supervisor entity is an entity that receives status updates from other entities and a subordinate entity is an entity that reports status updates to another entity. The subordinate entities report their status and status of their subordinate entities to the supervisor entity. The supervisor and subordinate entities comprise part or all of entity status update module configured to receive status update from various subordinate entities and report status updates to various supervisor entities.

The entity status module comprises an entity status controller, a subordinate entity determination module, an entity status update module, an entity status reporting module and a status storage. The entity status controller is configured to receive a status message from a first subordinate entity subordinate to the parent entity that includes the entity status controller. On receiving the message, the entity status controller is configured to direct the subordinate entity determination module to determine a second subordinate entity subordinate to the first subordinate entity. The subordinate entity determination module is configured to determine the entities subordinate to a given entity in response to receiving a request to make the determination.

After receiving an identification for the determined second subordinate entity, the entity status controller is configured to direct the entity status update module to update the status of the second subordinate entity based on the status message received earlier by the entity status controller. The entity status update module is configured to update the status of the determined second subordinate entity based on the received status message. Accordingly, the entity status update module updates the status of the second subordinate entity to active if the received message indicates the status of the first subordinate entity to be active. Similarly, the entity status update module is configured to update the status of the second subordinate entity to inactive if the received message indicates the status of the first subordinate entity to be inactive. In one embodiment, the entity status update module is configured to update the status of a given entity by writing the updated status to the status storage.

Additionally, the entity status update module is configured to update the status of the second subordinate entity after receiving a message indicating a change in the status of the second subordinate entity. In one embodiment, the entity status updated module is configured to update the status of the second subordinate entity after the change in second subordinate entity's status has stabilized.

The entity status controller is also configured to direct the entity status reporting module to report the change in the second subordinate entity's status to a third entity. The entity status reporting module in configured to report the status update to the third entity. In one embodiment, the entity status reporting module is configured to report the status update after the updated status has stabilized.

The status storage is configured to store the status of various entities.

BRIEF DESCRIPTION OF THE DRAWINGS

The invention is illustrated by way of example, and not by way of limitation in the figures of the accompanying drawings.

Figure 1:
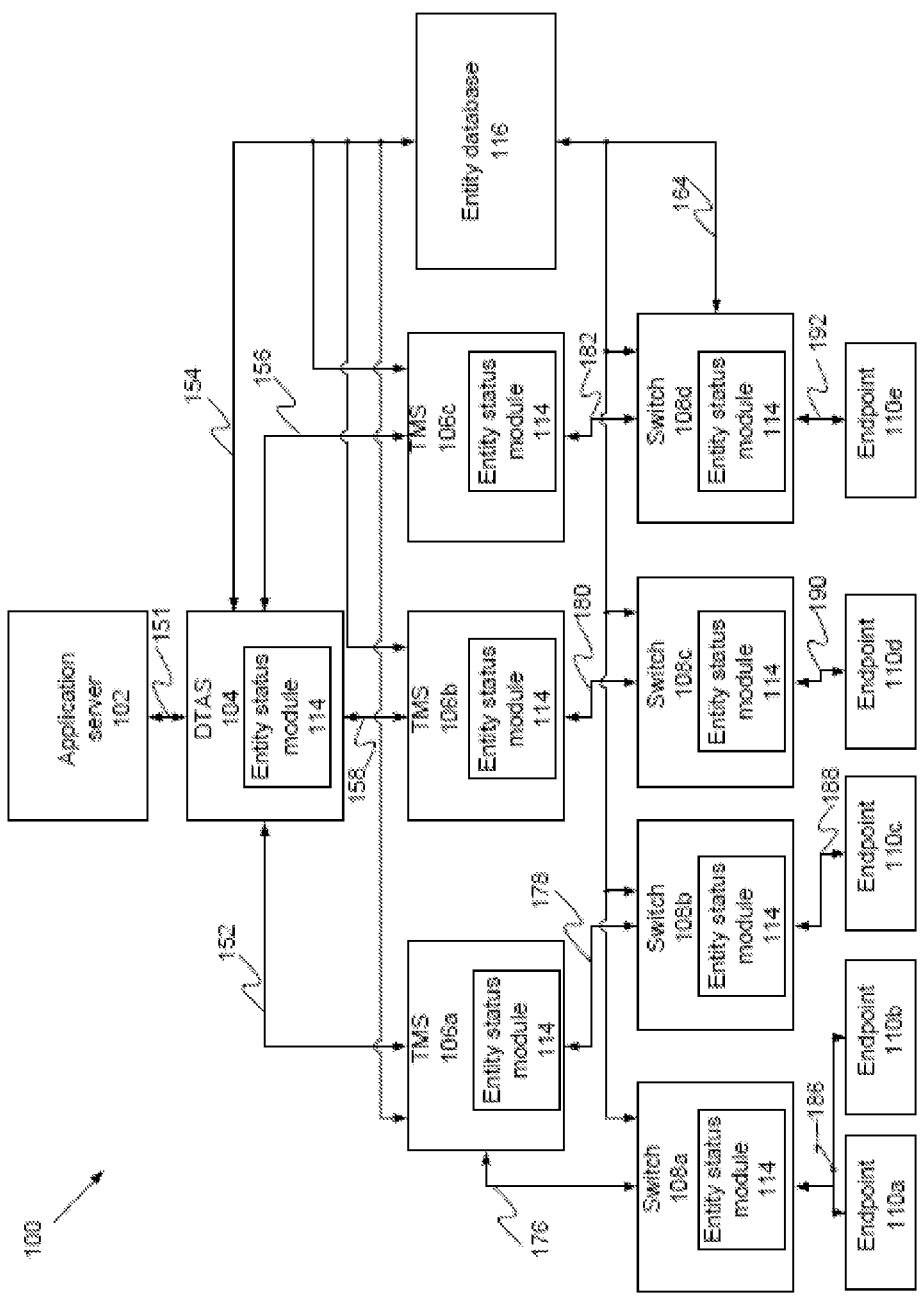
FIG. 1 illustrates a VoIP telephony system 100 according to one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Systems and methods for efficiently updating the status of various network entities are described. Instead of every subordinate entity reporting its status to the supervisor entity, an intermediate entity collectively reports the status of the subordinate entities to the supervisor entity. As a result, the supervisor entity can update the status of multiple subordinate entities based on one status update from the intermediate entity. The system and method for status updating are described in the context of a VoIP telephony system. However, the described systems and methods can be used in various other hierarchical networks.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the telecommunication arts to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the invention may be further divided into logical modules. One of ordinary skill in the art will understand that these modules can be implemented in hardware, firmware and/or software. In one embodiment, the modules are implemented in form of computer instructions stored in a computer readable storage medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing various status requests and status of entities in order to attain the desired status update.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Telephony System Example

FIG. 1 illustrates a voice over telephony system 100 according to one embodiment of the invention. The voice over telephony system 100 comprises an application server 102, a DTAS (Distributed Telephony Application Service) module 104, three TMS (Telephony Management Software) modules: TMS modules 106a-c (generally referred to as TMS module 106), an entity database module 116, four switch modules: switch modules 108a-d (generally referred to as switch module 108) and five endpoints modules 110a-e (generally referred to as endpoint 110). A voice over telephony system 100 can include other network or telephony entities not shown in FIG. 1.

Application server 102 is a hardware or software server configured to host business logic and business processes for various applications. In one embodiment, various business logic or business processes in the application server 102 maintain the state of one or more other entities in telephony system 100 like DTAS module 104, TMS module 106, switch 108 and endpoint 110. In another embodiment, the business logic or the business processes query the entity database 116 to determine the state of various entities in the telephony system 100. In yet another embodiment, the application server 102 comprises an entity status update module 114. However, the application server 102 does not report status updates to any other entities and therefore the entity status update module 114 in application server 102 does not report status updates to a supervisor entity. The application server 102 is communicatively coupled to DTAS module 104 through a communication bus 151. A communication bus is a communication channel used in the art to exchange electronic signals. The application server 102 receives status updates for its subordinate entities from DTAS module 104 through the communication bus 151.

A second and a third entity is subordinate to a first entity if the first entity receives status updates for the second and the third entity. For example, DTAS module 104, TMS module 106, Switch 108 and Endpoint 110 are subordinate entities to Application server 102. The first entity receiving status for the other entities is a supervisor entity to the status reporting entities. Accordingly, in this example, the first entity is a supervisor entity to the second and the third entity. Moreover, if the third entity reports its status to the second entity and the second entity reports the third entity's status to the first entity, the second entity, and not the third entity, is an immediate subordinate to the first entity. An entity can be subordinate to one entity and a supervisor to another. For example, consider a configuration where the third entity reports its status to the second entity and the second entity reports its own status and/or the status of the third entity to the first entity. In this configuration, the second entity is a supervisor to the third entity and a subordinate to the first entity. The terms subordinate and supervisor are meant to describe only the status reporting and status receiving roles of various entities. These terms are not meant to define the entities' relative positions in regards to other functions.

DTAS module 104 is configured to present to the application server 102 with an interface for the endpoints 110 controlled by various TMS modules 106 and switches 108. The DTAS module 104 comprises an entity status module 114. The entity status module 114 is configured to maintain and report status of various entities in telephony system 100. The entity status module 114 is described in further detail in FIGS. 2A, 3 and 4. The DTAS module 104 is communicatively coupled to TMS module 106a through communication bus 152, to TMS module 106b through communication bus 158, to TMS module 106c through communication bus 156 and to entity database module 116 through communication bus 154. The DTAS module 104 uses these communication buses 152-158 to receive status updates from various TMS modules 106.

The TMS module 106 is configured to present a computer-telephony integration (CTI) view of one or more switches managed by the TMS module 106. A TMS module 106 can manage zero or more switches 108a-d. Note that switches 108a-d can operate without an associated TMS module 106 if CTI features are not being used. The TMS module 106 comprises an entity status module 114 to maintain status of various entities in telephony system 100. The TMS module 106a is communicatively coupled to DTAS module 104 through communication bus 152, to switch module 108a through communication bus 176, to switch module 108b through communication bus 178 and to entity database module 116 through communication bus 154. The TMS module 106b is communicatively coupled to DTAS module 104 through communication bus 158, to switch module 108c through communication bus 180 and to entity database module 116 through communication bus 154. The TMS module 106c is communicatively coupled to DTAS module 104 through communication bus 156, to switch module 108d through communication bus 182 and to entity database module 116 through communication bus 154. The TMS modules 106 receive status update messages from their communicatively coupled switches 108 through the communication bus 176-182 between them. The TMS modules 106 update the DTAS 104 module with the received status updates through the communication bus 152, 156, 158 between them. In one embodiment, TMS modules 106 and DTAS modules 104 also update entity database module 116 with the received status updates.

Entity database module 116 is configured to store information about various entities and their relationship with other entities in telephony system 100. FIG. 2B is a block diagram that illustrates the entity database module 116 according to one embodiment of the invention. The entity database module 106 comprises a plurality of supervisor id 222a-n (generally referred to as supervisor id 222) and one or more subordinate id 226a-m (generally referred to as subordinate id 226) associated with each supervisor id 222. Optionally, entity database module 116 also includes a status for these ids. For example, a supervisor id 222 can have an active status 224*a* or inactive status 224*b* and a subordinate id 226*a* can have an active status 228*a* or an inactive status 228*b*.

A supervisor id 222 is a string that uniquely identifies a supervisor entity. Examples of supervisor id 222 include the IP address of supervisor entities like the application server 102, DTAS module 104, TMS module 106 and switch 108. Another example of supervisor id 226 is [entity1].[entity2].[entity3]. In this example, [entity1], [entity2] and [entity3] are strings associated with various entities in telephony system 100. This form of supervisor id uniquely identifies a supervisor entity and additionally provides information about the entity's place in hierarchy of telephony system 100. In the above example, entity associated with [entity2] is subordinate to entity associated with [entity1], and entity associated with [entity3] is subordinate to entities associated with [entity1] and [entity2] respectively. In one embodiment, an entity and all its subordinate entities can be identified using a wildcard. For example, [entity1].* identifies entity associated with [entity1] and all its subordinate entities. In this embodiment, when the entity database 116 receives a query for [entity1].*, the entity database 116 interprets that query as a query for entity associated with [entity1] and all its subordinate entities.

A subordinate id 226 is a string that uniquely identifies a subordinate entity. Examples of subordinate id 226 include the IP address of a subordinate entity like the DTAS module 104, TMS module 106, switch module 108 and endpoint 110. Another example of subordinate id 226 is [entity1].[entity2].[entity3]. In this example, [entity1], [entity2] and [entity3] are strings associated with various entities in telephony system 100. This form of subordinate id uniquely identifies a subordinate entity and additionally provides information about the entity's place in hierarchy of telephony system 100. In the above example, entity associated with [entity2] is subordinate to entity associated with [entity1], and entity associated with [entity3] is subordinate to entities associated with [entity1] and [entity2] respectively. In one embodiment, an entity and all its subordinate entities can be identified using a wildcard. For example, [entity1].* identifies entity associated with [entity1] and all its subordinate entities. In this embodiment, when the entity database 116 receives a query for [entity1].*, the entity database 116 interprets that query as a query for the entity associated with [entity1] and all its subordinate entities.

Referring back to FIG. 1, switch 108 in telephony system 100 represents a telephony switch that routes telephone calls between various endpoints 110. Switch 108 can be an analog, a digital, or a Voice over Internet Protocol (VoIP) switch. Additionally, switch 108 comprises an entity status module 114 for maintaining information about various entities associated with the switch 108. Switch 108*a* is communicatively coupled to TMS module 106*a* through communication bus 176, endpoints 110*a-b* through communication bus 186 and entity database module 116 through communication bus 164. Switch 108*b* is communicatively coupled to TMS module 106*a* through communication bus 178, endpoint 110*c* through communication bus 188 and entity database module 116 through communication bus 164. Switch 108*c* is communicatively coupled to TMS module 106*b* through communication bus 180, endpoint 110*d* through communication bus 190 and entity database module 116 through communication bus 164. Switch 108*d* is communicatively coupled to TMS module 106*c* through communication bus 182, endpoint 110*e* through communication bus 192 and entity database module 116 through communication bus 164. Switches 108 receive status update messages from their communicatively coupled endpoints 110 through the communication bus between them. Switches 108 update the TMS modules 106 communicatively coupled to the switches 108 with the received status updates. In one embodiment, switch 108 and TMS module 106 also update entity database module 116 with the received status update.

An endpoint 110 enables a user to carry on a phone call. In one embodiment, endpoint 110 comprises an entity status module 114. However, endpoint 110 does not receive status updates from any entities. Accordingly, the entity status module 114 in endpoint 110 reports its status to one or more supervisor entities but does not report status updates for any other entities. Examples of endpoints 110 include a video conferencing device, a multipoint control unit (MCU), a conference bridge, an analog terminal adapter (ATA), and any other device that originates and/or terminates a media stream. Endpoints 110*a-b* are communicatively coupled to switch 108*a* through communication bus 186. Endpoint 110*c* is communicatively coupled to switch 108*b* through communication bus 188. Endpoint 110*d* is communicatively coupled to switch 108*c* through communication bus 190 and endpoint 110*e* is communicatively coupled to switch 108*d* through communication bus 192. Endpoints 110 transmit update messages to their communicatively coupled switches 108 through the communication bus between them.

FIG. 1 illustrates a configuration of telephony system 100 where each subordinate entity reports its status and status of its any existing subordinates to only one supervisor entity. For example, endpoint 110 reports to switch 108 only. Similarly switch 108 reports to TMS module 106 only, TMS module reports to DTAS 104 only and DTAS 104 reports to application server 102 only. In another embodiment (not shown) of telephony system 100, a subordinate module reports its status and status of its any existing subordinates to more than one entity. For example, switch 108 reports its status and status of endpoints 110 to DTAS 104 and application server 102. In yet another embodiment, a supervisor entity receives status from subordinate entities that are not its immediate subordinate entity. For example, DTAS 104 receives status messages from switch 108.

Figure 2A:
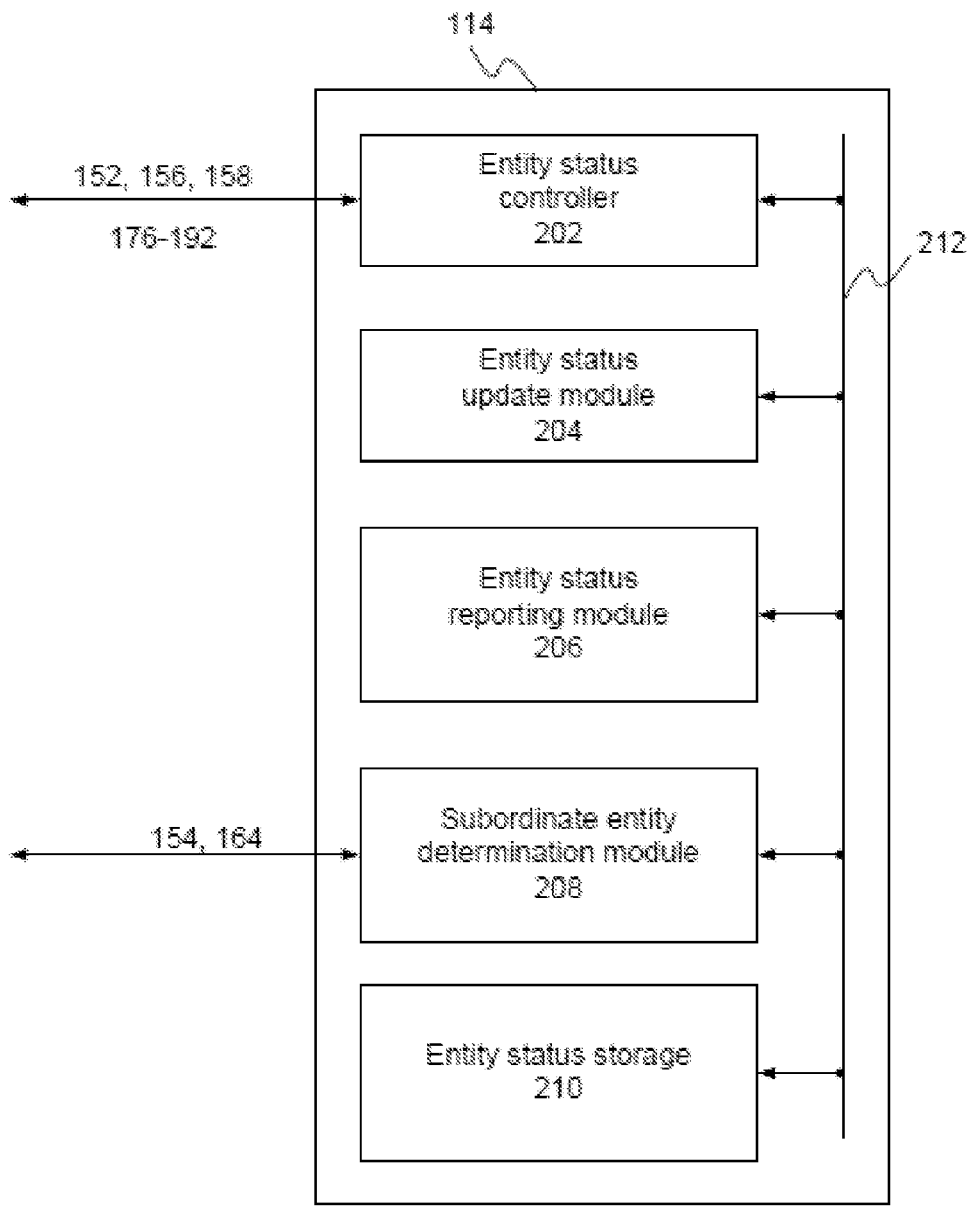
FIG. 2A is a block diagram illustrating the entity status module 114 according to one embodiment of the invention.
Figure 2B:
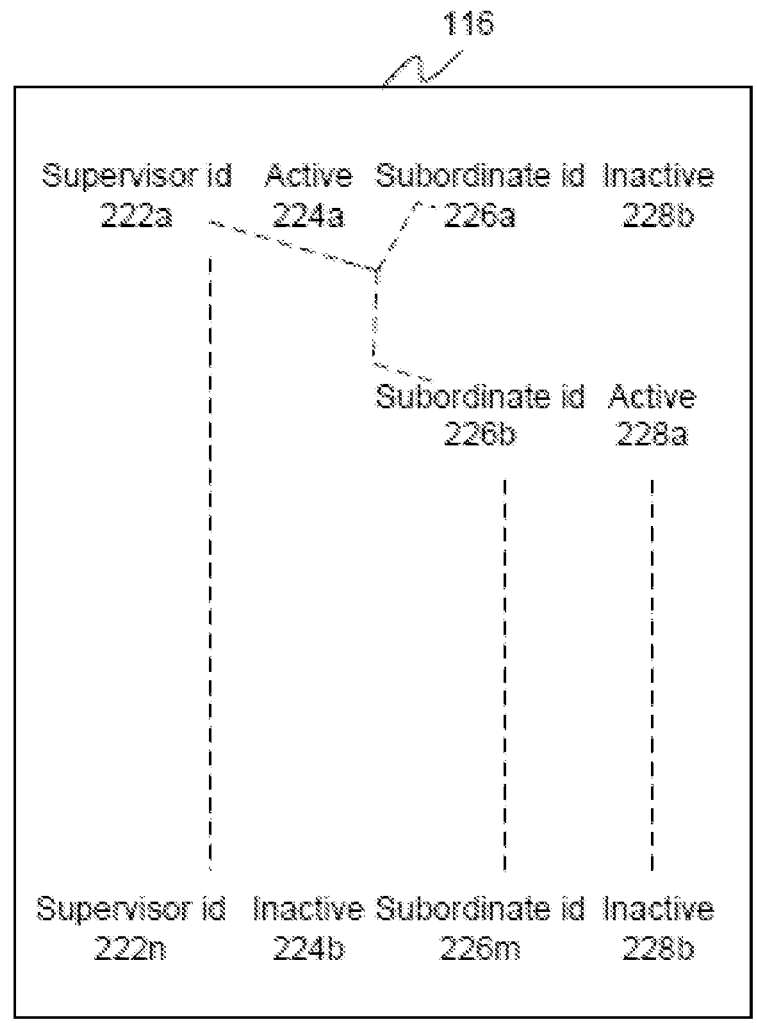
FIG. 2B is a block diagram illustrating the entity database module 116 according to one embodiment of the invention.

FIG. 2A is a block diagram illustrating the entity status module 114 according to one embodiment of the invention. The entity status module 114 maintains status of entities subordinate to the parent entity that comprises the entity status module 114. In one embodiment, the entity status module 114 resides in a parent entity that does not have any subordinate entities. For example, endpoints 110 in FIG. 1 do not have any subordinate entities. In such an embodiment, the entity status module 114 does not maintain the status of subordinate entities as none exist.

The entity status module 114 is also configured to report the status of subordinate entities to an entity that is a supervisor to the parent entity. In one embodiment, the entity status module 114 resides in a parent entity that does not have any supervisor entities. For example, application server 102 does not have any supervisor entities. In such an embodiment, the entity status module 114 does not report the status of subordinate entities to a supervisor entity as none exist.

The entity status module 114 comprises an entity status controller 202, an entity status update module 204, an entity status reporting module 206, a subordinate entity status determination module 208 and an entity status storage 210. All these modules are communicatively coupled to each other through communication bus 212.

Entity status controller 202 is configured to direct other modules in the entity status module 114 to execute their tasks at appropriate times. The functions of entity status controller 202 are described below in FIG. 3 and FIG. 4.

Entity status update module 204 is configured to update the entity status storage 210 with status of entities subordinate to the parent entity. In one embodiment, the entity status update module 204 is communicatively coupled to the entity database module 116 and stores the updated status of the subordinate entities in entity database module 116. The functions of entity status update module 204 are described in further detail in FIG. 4.

Entity status reporting module 206 is configured to report to the parent entity's supervising entity the parent entity's status and status of the parent's subordinate entities. In one embodiment, the entity status reporting module 206 transmits a query signal or a query message and queries the subordinate entity determination module 208 to determine the entities subordinate to the parent entity. The entity status reporting module 204 then determines the status of the subordinate entities and transmits the determined status to the supervising entity. The functions of entity status reporting module 206 are further described in FIG. 3.

The subordinate entity determination module 208 is configured to determine entities that are subordinate to the parent entity that includes the subordinate entity determination module 208. Optionally, the subordinate entity determination module 208 is also configured to determine the parent entity's supervisor. In one embodiment, the subordinate determination module 208 is communicatively coupled to entity database module 116 and the subordinate determination module 208 queries the entity database module 116 to determine the subordinate entities or the supervisor entity. In another embodiment, the subordinate entities and/or the supervisor entity are assigned based on a known algorithm. An example of such an algorithm is applying a bitwise AND or a bitwise OR to an entity's IP address or a string of bits associated with the entity and a constant to determine the supervising entity. Regardless of the algorithm used to assign subordinate entities or supervisor entity, the subordinate entity determination module 208 is pre-configured with the same algorithm and the subordinate entity determination module 208 executes the same algorithm to determine the subordinate entities or the supervisor entity.

The entity status storage module 210 is volatile or non-volatile memory configured to store status of various entities in telephony system 100.

Figure 3:
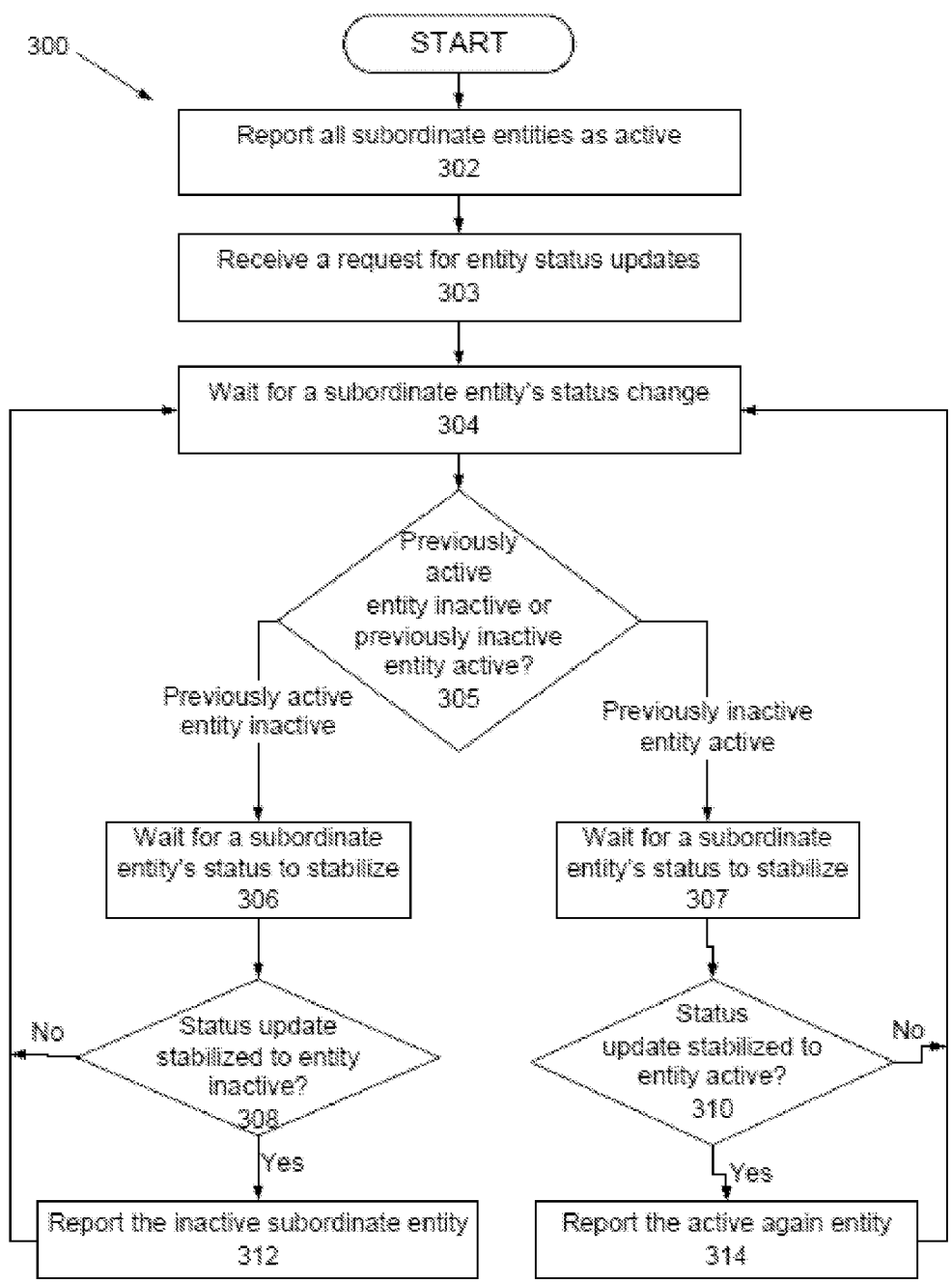
FIG. 3 is a flow chart illustrating a method for an entity reporting its own status and its subordinate entities' status according to one embodiment of the invention.

FIG. 3 is a flow chart illustrating a method for a first entity reporting its own status and its subordinate entities' status according to one embodiment of the invention. The entity status controller 202 in the first entity determines an appropriate time to report the initial status of the first entity and its subordinates. In one embodiment, the entity status controller 202 determines the appropriate time to be shortly after the first entity is initialized. In another embodiment, the appropriate time is a configurable duration after the first entity is initialized. In yet another embodiment, the appropriate time is after the first entity's status has stabilized. A supervisor entity determines a subordinate entity to be stable after receiving more than one message from the subordinate entity. The supervisor or the subordinate determines its own status to be stable after a pre-configured amount of resources (i.e. memory and/or processing power) are available for executing their functions in the telephony system 100. Regardless of how the appropriate time is determined, the entity status controller 202 transmits a signal to entity status reporting module 208 directing the entity status reporting module 206 to report the entities' status to the supervisor of first entity.

The entity status reporting module 206 queries the subordinate entity determination module 208 to determine the supervisor of the first entity. The entity status reporting module 206 then reports 302 the first entity and all its subordinate entities as active to the supervisor entity. In one embodiment, the reporting comprises broadcasting or transmitting to one or more supervisor entities an active status message. An example of an active status message is an active message with the first entity's IP address or an identifying string like supervisor id 222a or subordinate id 226a. Another example of an active status message is an active message with [identifying string].* wherein the [identifying string] is a string identifying the first entity. The supervisor entities receive this active status message and interpret this message as the entity and all its subordinate entities being active. In this manner, one message beneficially reports the status of numerous entities and avoids network congestion and overloading supervisor entities.

Note that the entity status reporting module 206, at this stage, do not determine the status of the subordinate entities and instead reports them as active regardless of whether the subordinate entities are active or not. Accordingly, the entity status reporting module 206 assumes, at this stage, that all subordinate entities are active unless informed otherwise.

In another embodiment, the entity status controller 202 in the first entity determines the status of entities subordinate to the first entity before reporting the status to a supervisor entity. After determining the status of the subordinate entities, the entity status controller 202 transmits a signal to entity status reporting module 208 directing the entity status reporting module 206 to report the entities' status to the supervisor entity. The entity status reporting module 206 then reports 302 to the supervisor entity the status of the first entity and the determined status of entities subordinate to the first entity. An example of status message transmitted to the supervisor entity includes a list of identifications for active entities and a list of identifications for inactive entities. One of the advantages of this approach is that the supervisor receives through a single message the initial status of the first entity and entities subordinate to the first entity.

Next, the first entity receives 303 a signal from a supervisor entity, the signal requesting the first entity to update the supervisor entity with any status updates for entities subordinate to the first entity. In one embodiment, the first entity does not receive a request for status update from the supervisor entity. Instead, the first entity automatically transmits the status updates to the supervisor entity after detecting a status update.

The entity status controller 202 in the first entity waits 304 for any changes in status of its subordinate entities (i.e. entities subordinate to the first entity). In one embodiment, the subordinate entities repeatedly send an alive message to their supervisor entity (i.e. the first entity) and the entity status controller 202 in the first entity receives these alive messages. If the entity status controller 202 does not receive an alive message from a subordinate entity for a pre-configured time period, the entity status controller 202 determines 305 that the subordinate entity is now inactive. Accordingly, the entity status controller 202 directs the entity status reporting module 206 and the entity status reporting module 206 transmits 312 a message to one or more supervisor entities reporting the subordinate entity as inactive. In one embodiment, the entity status controller 202 also directs the entity status update module 204 and the entity status update module 204 updates the status of the subordinate entity in entity status storage 210 or the entity database module 116. The entity status controller 202 then waits 304 again for a change in a subordinate entity's status. In one embodiment, the entity status controller 202 first receives 303 another request for entity status updates and then the entity status controller 202 executes steps 305-314.

If the entity status controller 202 receives an alive message from a previously inactive subordinate entity, the entity status controller 202 determines 305 that the subordinate entity is active again. The entity status controller 202 can query the entity status storage 210, or alternatively the entity database module 116, to determine the previous state of the subordinate entity. This previous state determination helps the entity status controller 202 in determining if the active message is received from a previously active or inactive subordinate entity.

After determining 305 that a subordinate entity is active again, the entity status controller 202 directs the entity status reporting module 206 and the entity status reporting module 206 transmits 314 a message to one or more supervisor entities reporting the subordinate entity as active. In one embodiment, the entity status controller 202 also directs the entity status update module 204 and the entity status update module 204 updates the status of the subordinate entity in entity status storage 210 or the entity database module 116. The entity status controller 202 then waits 304 again for a change in a subordinate entity's status. In one embodiment, the entity status controller 202 first receives 303 another request for entity status updates and then the entity status controller 202 executes steps 305-314.

In one embodiment, the entity status controller 202 in the first entity does not immediately report a subordinate entity's status update to the supervisor entity. The entity status controller 202 instead first waits 306, 307 for the subordinate entity's status to stabilize. The entity status controller 202 determines an entity's updated status to be stable after receiving more than one status update message with the updated status for the subordinate entity. If the entity status controller 202 determines 308 that a subordinate entity's status has stabilized to inactive status, the entity status controller 202 directs the entity status reporting module 206 and the entity status reporting module 206 reports 312 the updated status to the supervisor entity. Similarly, if the entity status controller 202 determines 310 that a subordinate entity's status has stabilized to active status, the entity status controller 202 directs the entity status reporting module 206 and the entity status reporting module 206 reports 314 the updated status to the supervisor entity.

Figure 4:
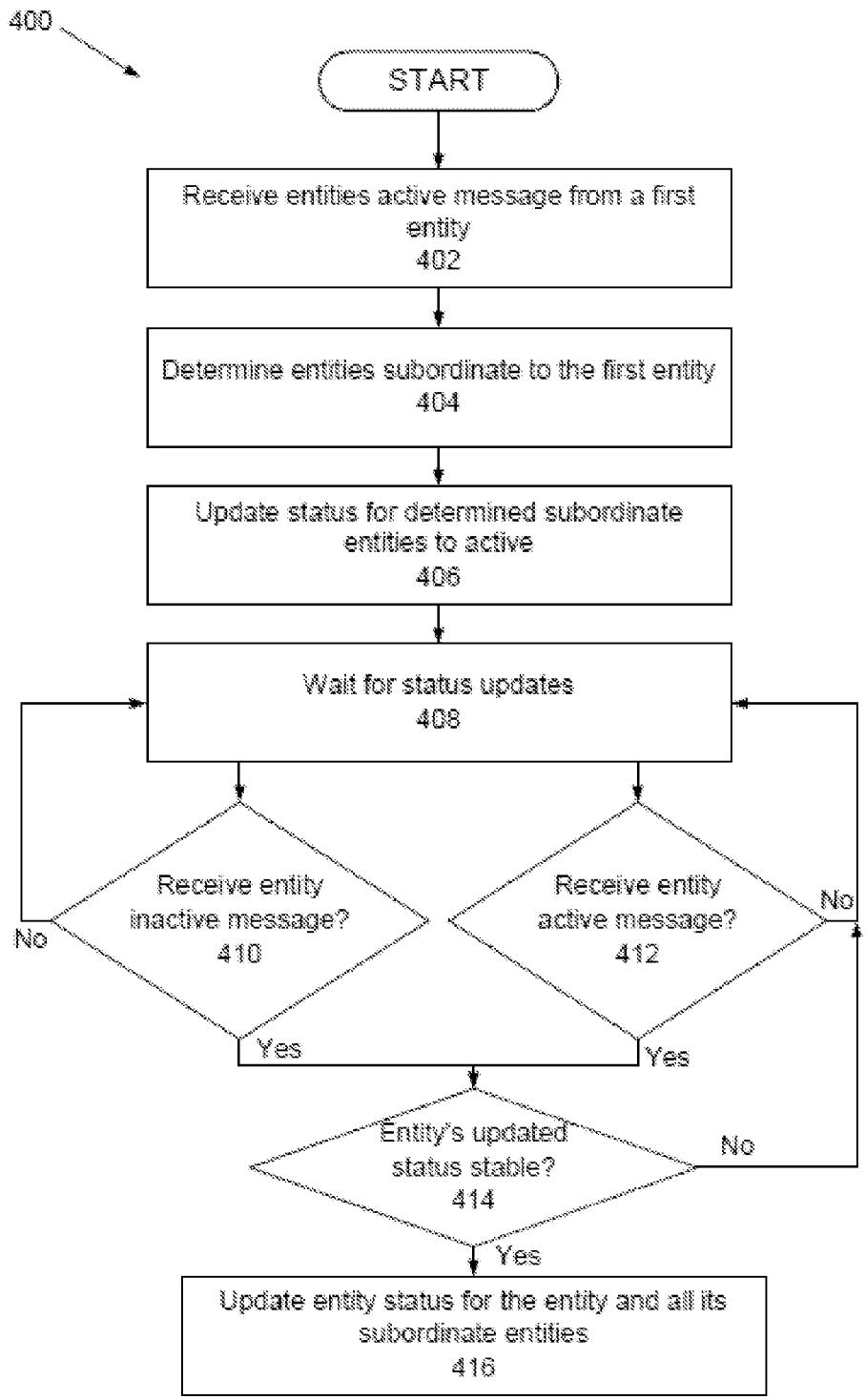
FIG. 4 is a flow chart illustrating a method for updating the status of subordinate entities according to one embodiment of the invention.

FIG. 4 is a flow chart illustrating a method for updating the status of subordinate entities according to one embodiment of the invention. After a first entity is initialized, the first entity sends an active message to its supervisor entity. The entity status controller 202 in supervisor entity receives 402 the active message from the first entity. The entity status controller 202 then directs the subordinate entity determination module 208 and the subordinate determination module 208 queries 404 the entity database module 116 to determine the entities subordinate to the first entity. In one embodiment, the subordinate determination module 208 transmits a query to entity database module 116 to return the entities associated with identification string [first entity].* wherein [first entity] is an identification string associated with the first entity. As explained above, the entity database 116 associates [first entity].* with first entity and entities subordinate to the first entity. Accordingly, the entity database module 116 returns identification strings for the first entity and the entities subordinate to the first entity.

Next, the entity status controller 202 receives the determined subordinate entities and directs the entity status update module 204 to update the status of the first entity and its subordinate entities to active status. Consequently, the entity status update module 204 updates 406 the status of the determined entities in entity status storage 210. In one embodiment, the entity status update module 204 updates the status of the entities in entity database module 116. In this manner, a supervisor entity beneficially updates the status of multiple entities based on a single status message received from its immediate subordinate entity.

The entity status controller 202 then waits 408 for additional update messages from the subordinate entities. In one embodiment, the entity status controller 202 receives 410-412 update messages from its immediate subordinate entities and not from entities subordinate to the immediate subordinate entities. In another embodiment, the subordinate entities of the immediate subordinate entities report their status directly to the supervisor entity. Regardless of how the subordinate entity's status update is reported to the supervisor entity, the entity status controller 202 in the supervisor entity determines 410 that a subordinate entity is inactive based on the received status update message. Next, the entity status controller 202 directs the entity status update module 204 and the entity status update module 204 updates 416 the subordinate entity's status to inactive in entity status storage 210 or entity database module 116. Similarly, the entity status controller 202 receives 412 an active message for a subordinate entity and directs the entity status update module 204 to update the entity status for the subordinate entity to active. Consequently, the entity status update module 204 updates 416 the subordinate entity's status to active.

In one embodiment, the entity status controller 202 in supervisor entity does not immediately update a subordinate entity's status after receiving a status update from the subordinate entity. The entity status controller 202 instead first determines 414 if the subordinate entity's updated status is stable. If the subordinate entity's status has stabilized, the entity status updated module 204 executes step 416. Otherwise, the entity status controller 202 waits 408 for additional update messages from the subordinate entities.

The entity status controller 202 determines 414 a subordinate entity's updated status to be stable after receiving more than one status update message reporting the same status update. In this embodiment, the subordinate entity reporting the status update is configured to send more than one status update message and confirm the stabilized updated status of the subordinate entity.

In another embodiment, the reporting subordinate entity does not send a status update for its own status or status of another entity unless the status of the updated entity has stabilized. In that embodiment, step 414 is skipped.

What is claimed is:

1. A computer-implemented method comprising:
   determining, by an entity status controller in a first entity, an appropriate time for transmitting a status message reporting a status of the first entity to a second entity, wherein the first entity is a device subordinate to the second entity in a hierarchical network, the status of the first entity reflecting whether or not the first entity is active; and
   transmitting, by an entity status reporting module in the first entity, the status message reporting the status of the first entity to the second entity, the status message including a list of identifications for active entities and a list of identifications for inactive entities, such that the second entity receives the status of the first entity and entities subordinate to the first entity in the hierarchical network, wherein the appropriate time for transmitting the status message is a predetermined time after the first entity is initialized or a time after the status of the first entity has stabilized.

2. The method of claim 1 wherein the hierarchical network comprises at least four hierarchical levels of entities, and there is at least one hierarchical level, comprising one or more entities, subordinate to the first entity.

3. The method of claim 1 wherein the appropriate time is a configurable duration after the first entity is initialized.

4. The method of claim 1, wherein the hierarchical network comprises at least four hierarchical levels of entities, and there are at least two hierarchical levels, each comprising one or more entities, subordinate to the first entity.

5. The method of claim 1, further comprising:
receiving a signal from the second entity, the signal requesting the first entity to update the second entity with any status updates for entities subordinate to the first entity.

6. The method of claim 1, further comprising:
receiving, by the entity status controller, a first set of alive messages from an entity subordinate to the first entity;
determining, by the entity status controller, that the entity status controller is no longer receiving the first set of alive messages from the entity subordinate to the first entity; and
in response to the determining, transmitting, by the entity status reporting module, a second status message to the second entity indicating the entity subordinate to the first entity as inactive.

7. The method of claim 6, further comprising;
receiving, by the entity status controller, a second set of alive messages from the entity subordinate to the first entity;
in response to receiving the second set of alive messages from the entity subordinate to the first entity, determining, by the entity status controller, that the entity subordinate to the first entity is active; and
in response to determining that the entity subordinate to the first entity is active, transmitting, by the entity status reporting module, a third status message to the second entity indicating the entity subordinate to the first entity as active.

8. The method of claim 1, further comprising:
determining, by the entity status controller, a change in the status of the first entity; and
upon determining the change, transmitting, by the entity status reporting module, a status message reporting a subsequent status of the first entity to the second entity.

9. The method of claim 8, further comprising:
receiving, by the entity status controller, a signal from the second entity, the signal requesting a status update to the second entity.

10. The method of claim 8, further comprising:
determining, by the entity status controller, that the status of the first entity has stabilized; and
in response to determining that the status of the first entity has stabilized, transmitting, by the entity status reporting module, the status message reporting the status of the first entity to the second entity.

11. An entity status reporting apparatus in a first entity for reporting a status of the first entity to a second entity, the apparatus comprising:
an entity status controller in the first entity configured to determine an appropriate time for transmitting a status message reporting the status of the first entity to the second entity, wherein the first entity is a device subordinate to the second entity in a hierarchical network, the status of the first entity reflecting whether or not the first entity is active; and
an entity status reporting module in the first entity, communicatively coupled to the entity status controller, configured to transmit the status message reporting the status of the first entity to the second entity, the status message including a list of identifications for active entities and a list of identifications of inactive entities, such that the second entity receives the status of the first entity and all entities subordinate to the first entity,
wherein the entity status controller determines the appropriate time for transmitting the status message is a predetermined time after the first entity is initialized or a time after the status of the first entity has stabilized.

12. The entity status reporting apparatus of claim 11 wherein the hierarchical network comprises at least four hierarchical levels of entities in the hierarchical network each comprising one or more entities subordinate to the first entity.

13. The entity status reporting apparatus of claim 11 wherein the first entity has stabilized after a pre-configured amount of resources are available for executing system functions.

14. The entity status reporting apparatus of claim 11, wherein the hierarchical network comprises at least two hierarchical levels subordinate to the first entity, each level comprising one or more entities.

15. The entity status reporting apparatus of claim 11 wherein:
the entity status controller is further configured to receive a first set of alive messages from an entity subordinate to the first entity and determine that the entity status controller is no longer receiving the first set of alive messages from the entity subordinate to the first entity; and
the entity status reporting module is further configured to transmit a second status message to the second entity indicating the entity subordinate to the first entity as inactive in response to the entity status controller determining that the entity status controller is no longer receiving the first set of alive messages from the entity subordinate to the first entity.

16. The entity status reporting apparatus of claim 15 wherein:
the entity status controller is further configured to receive a second set of alive messages from the entity subordinate to the first entity and determine that the entity subordinate to the first entity is active in response to receiving the second set of alive messages from the entity subordinate to the first entity; and
the entity status reporting module is further configured to transmit a third status message to the second entity indicating the entity subordinate to the first entity as active in response to the entity status controller determining that the entity subordinate to the first entity is active.

17. The entity status reporting apparatus of claim 11 wherein:
the entity status controller is further configured to determine a change in the status of the first entity; and
the entity status reporting module is further configured to transmit a status message reporting a subsequent status of the first entity to the second entity upon the entity status controller determining the change.

* * * * *